United States Patent
Woodbridge et al.

(10) Patent No.: US 7,603,575 B2
(45) Date of Patent: Oct. 13, 2009

(54) FREQUENCY-DEPENDENT VOLTAGE CONTROL IN DIGITAL LOGIC

(76) Inventors: Nancy G. Woodbridge, 106 El Norte Ct., Austin, TX (US) 78734; Mark N. Fullerton, 6636 W. William Cannon Dr., Apt. 218, Austin, TX (US) 78735; Amit Dor, 3 Har-Sinai Street, Raanana 43307 (IL); Vasudev Bibikar, 9620 Rainlilly La., Austin, TX (US) 78759; Rajith Mavila, 4825 Davis La., Apt. #534, Austin, TX (US) 78749

( * ) Notice: Subject to any disclaimer, the term of this patent is extended or adjusted under 35 U.S.C. 154(b) by 399 days.

(21) Appl. No.: 11/173,218

(22) Filed: Jun. 30, 2005

(65) Prior Publication Data

US 2007/0006007 A1   Jan. 4, 2007

(51) Int. Cl.
*G06F 1/00* (2006.01)
*G06F 1/32* (2006.01)

(52) U.S. Cl. ............ 713/322; 713/300; 713/320; 327/512; 327/513

(58) Field of Classification Search ........... 713/320, 713/323, 322, 300; 327/512, 513
See application file for complete search history.

(56) References Cited

U.S. PATENT DOCUMENTS

| | | | | |
|---|---|---|---|---|
| 5,778,237 | A * | 7/1998 | Yamamoto et al. | 713/322 |
| 5,974,556 | A * | 10/1999 | Jackson et al. | 713/322 |
| 6,721,892 | B1 * | 4/2004 | Osborn et al. | 713/300 |
| 6,986,023 | B2 | 1/2006 | Paver et al. | |
| 6,996,730 | B2 * | 2/2006 | Bonnett | 713/322 |
| 7,047,393 | B2 | 5/2006 | Paver et al. | |
| 7,100,001 | B2 | 8/2006 | Edirisooriya et al. | |
| 7,165,165 | B2 | 1/2007 | Woodbridge et al. | |
| 7,245,945 | B2 | 7/2007 | Paver et al. | |
| 7,302,600 | B2 | 11/2007 | Bibikar et al. | |
| 7,321,957 | B2 | 1/2008 | Khan et al. | |
| 7,334,158 | B2 | 2/2008 | Bibikar et al. | |
| 2003/0061431 | A1 | 3/2003 | Mears et al. | |
| 2005/0071705 | A1 * | 3/2005 | Bruno et al. | 713/500 |
| 2005/0132186 | A1 | 6/2005 | Khan et al. | |
| 2005/0138409 | A1 | 6/2005 | Sheriff et al. | |
| 2005/0213399 | A1 | 9/2005 | Hoover et al. | |
| 2005/0262360 | A1 | 11/2005 | Khan et al. | |
| 2006/0106954 | A1 | 5/2006 | Woodbridge | |
| 2006/0106962 | A1 | 5/2006 | Woodbridge et al. | |
| 2006/0107077 | A1 | 5/2006 | Roth et al. | |
| 2006/0129701 | A1 | 6/2006 | Qawami et al. | |
| 2006/0129710 | A1 | 6/2006 | O'Connor et al. | |
| 2006/0135094 | A1 | 6/2006 | Dor et al. | |

* cited by examiner

*Primary Examiner*—Chun Cao
*Assistant Examiner*—Michael J Brown
(74) *Attorney, Agent, or Firm*—Blakely, Sokoloff, Taylor & Zafman LLP

(57) ABSTRACT

An electronic circuit comprises at least one digital logic circuit; and a power control circuit. The power control circuit is operable to adjust the voltage of a power signal supplied to the at least one digital logic circuit in response to a change in a clock frequency provided to the at least one digital logic circuit. In a further embodiment, the power controller is operable to increase the voltage of the power signal applied to the digital logic circuit before a frequency increase is made, and is operable to decrease the voltage of the power signal applied to the digital logic circuit after a frequency decrease is made.

12 Claims, 3 Drawing Sheets

FREQUENCY-DEPENDENT VOLTAGE CONTROL IN DIGITAL LOGIC

FIELD OF THE INVENTION

The invention relates generally to computerized system power management, and more specifically to controlling voltage in conjunction with frequency change in a computerized system.

BACKGROUND

A wide variety of devices, including personal digital assistants, cellular telephones, and appliances now incorporate sophisticated processors, monitors or displays, and other elements once found only in expensive computers. Incorporation of processors has enabled cellular telephones to do more than just serve as a telephone—it is now common for such cell phones to include phone directories, digital cameras, music playback, video games, and to offer a high degree of programmability or customization to the cell phone end user or service provider. Similarly, personal digital assistants, or PDAs, commonly include software including calendar, e-mail, word processing, and other traditional computer functions.

But, while traditional computers are usually plugged in to a wall socket or outlet that provides electric power on a continuous basis, many portable devices such as cell phones and PDAs are powered by rechargeable batteries incorporated into the electronic computerized device. This limits the amount of time one can use such a portable device to the amount of time the rechargeable battery can provide adequate power to operate the device. One could simply use bigger batteries in situations where long-lasting operation was desirable, but battery size and performance is often traded off for smaller overall device size, lighter weight, and lower cost.

Engineers have addressed this issue by developing electronic devices that require less power to operate, or that can operate at reduced speed to conserve power. Such methods are also sometimes employed in other systems such as normal desktop computers and laptop computers, particularly where significant power savings can be realized. Reduced power consumption in desktop computers results in a reduction in utility bills, energy demand, and pollution, and is particularly desirable when it can be implemented across a wide number of systems without a significant reduction in performance.

It is therefore desirable that computerized devices have power management capability such that power can be conserved.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

The examples of the invention presented here serve to illustrate how power can be managed in a digital logic circuit such as a computer processor to conserve energy. In some embodiments, power is managed by adjusting the voltage of a power signal supplied to one or more digital logic circuits in response to a change in a clock frequency provided to the digital logic circuits. In a further embodiment, the power controller is operable to increase the voltage of the power signal applied to the digital logic circuit before a frequency increase is made, and is operable to decrease the voltage of the power signal applied to the digital logic circuit after a frequency decrease is made.

Figure 1:
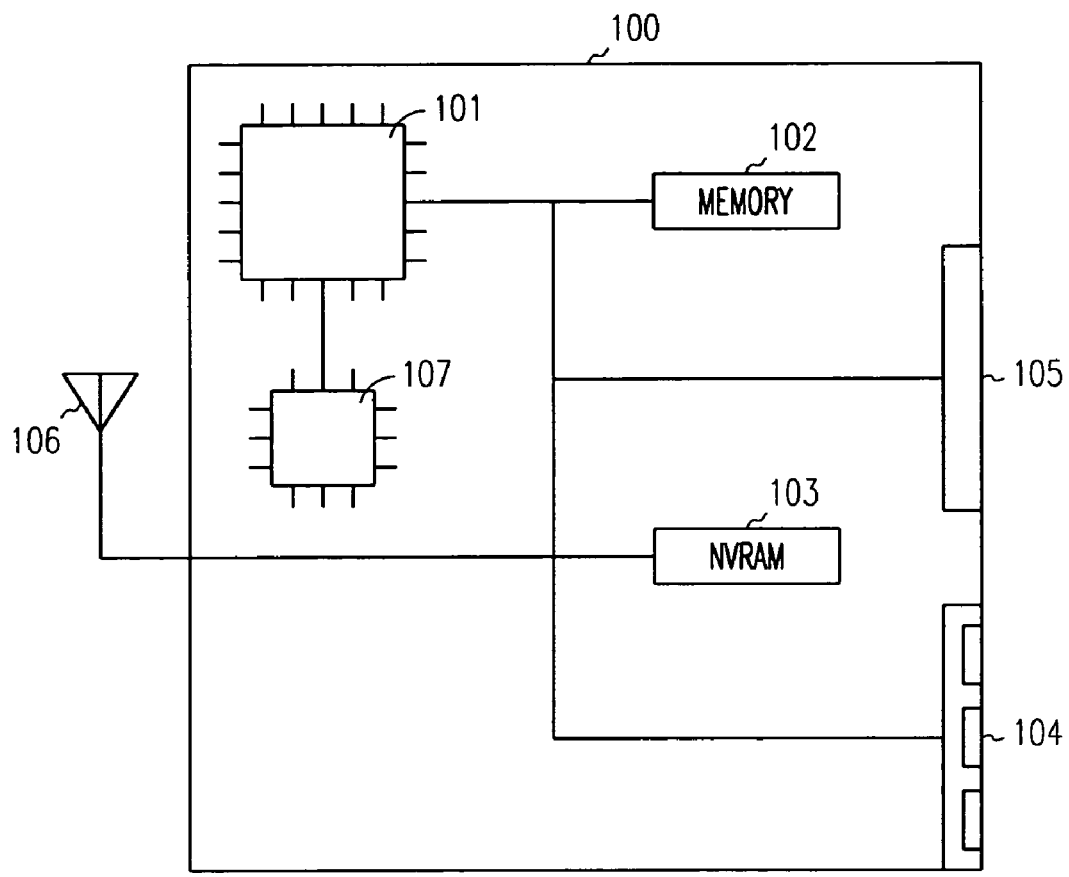
FIG. 1 is a block diagram of a computerized system employing a power controller consistent with an example embodiment of the invention.

FIG. 1 illustrates a block diagram of a computerized system employing a power controller, consistent with an example embodiment of the invention. A computerized device 100 contains a computer processor 101, coupled via a bus to a memory 102. A nonvolatile random access memory 103 is also coupled to the processor and to the memory, and is in an alternate embodiment replaced with or supplemented by a hard disk drive or other nonvolatile data storage module. A keypad or keyboard 104 is coupled to the processor to provide user input, and the computerized device is operable to display information to the user via display 105.

In a further embodiment, the device 100 is a portable wireless device powered by a battery and having an antenna 106, such as a monopole antenna, a stripline antenna, or any other type of antenna. The processor is coupled to a power controller 107, which is operable to control a frequency of a clock signal provided to at least one digital logic circuit in the processor 101. The power controller is further operable to control a power supply signal voltage provided to the digital logic circuit within the processor 101. In some embodiments, the power signal voltage and clock signal frequency are controlled based on selection between two or more power modes for the computerized system.

In operation, the processor executes program instructions loaded into memory 102 from nonvolatile random access memory 103 or another nonvolatile data storage device such as a hard disk drive. The processor also works with other data, such as information provided by the user via the keyboard 104 and information conveyed to the user through display 105 or other user interfaces such as a speaker. The executing program in many circumstances is not a stream of constantly executing program instructions, but comprises bursts of program operation followed by periods of inactivity. Devices such as cellular phones and wireless personal digital assistants (PDAs) use an antenna 106 coupled to an RF module to communicate wirelessly with other devices or communications networks.

When the processor is not actively executing program instructions, part or all of the processor can be brought to a state which provides a lower degree of processing capability, but in which one or more digital logic circuits consume less power. In some embodiments, this occurs by reducing the frequency of the clock signal provided to processor 101, or to a portion of the digital logic circuits within the processor. Each time the clock signal provided to a processor or other digital logic circuit changes state, many transistors within the processor change state, requiring a significant expenditure of energy even when no program instructions are being executed. The fewer times per second such state changes occur, the less power the digital logic circuit consumes. Reducing the clock frequency, or stopping the clock signal altogether, can therefore result in a reduction in power consumption.

The power controller 107 is in some embodiments operable to reduce the clock frequency provided as described above, and is further operable to vary the voltage of the power signal applied to the processor based on the clock frequency provided to the digital logic circuits within the processor. For example, when the frequency of the digital logic circuits is reduced from a normal operating frequency of 400 MHz to 50 MHz, the processor may be brought from a normal high voltage level of 3.3 Volts down to a lower voltage level such as 2.5 Volts or 1.5 Volts, or from another normal operating voltage to a lower voltage to further conserve power.

Although the processor 101 can issue commands to the power controller 107 to reduce the clock frequency supplied to the digital logic circuits, in some embodiments it does not directly alter the voltage of the power signal supplied to the same digital logic circuits. The voltage of the power signal is changed from a voltage supplied by a battery or another power source to a desired voltage based on the frequency of the clock signal supplied to the logic circuits, the temperature of the logic circuits, the semiconductor process or performance characteristics of the logic circuits, and other such parameters.

In one example, one or more logic circuits in a processor are provided a reduced clock frequency, such as a reduction in frequency from 400 MHz to 50 MHz, as part of a change in power mode. The power controller reduces the voltage applied to the logic circuits in response to the reduction in power mode, taking into account factors such as the new frequency, the process parameters, and the temperature of the circuit so that the voltage applied will allow the logic circuits to continue to be fully functional. Because a lower voltage is required to sustain normal operation of the logic circuits at lower operating frequencies, the voltage is reduced to conserve power after the frequency is reduced.

Figure 2:
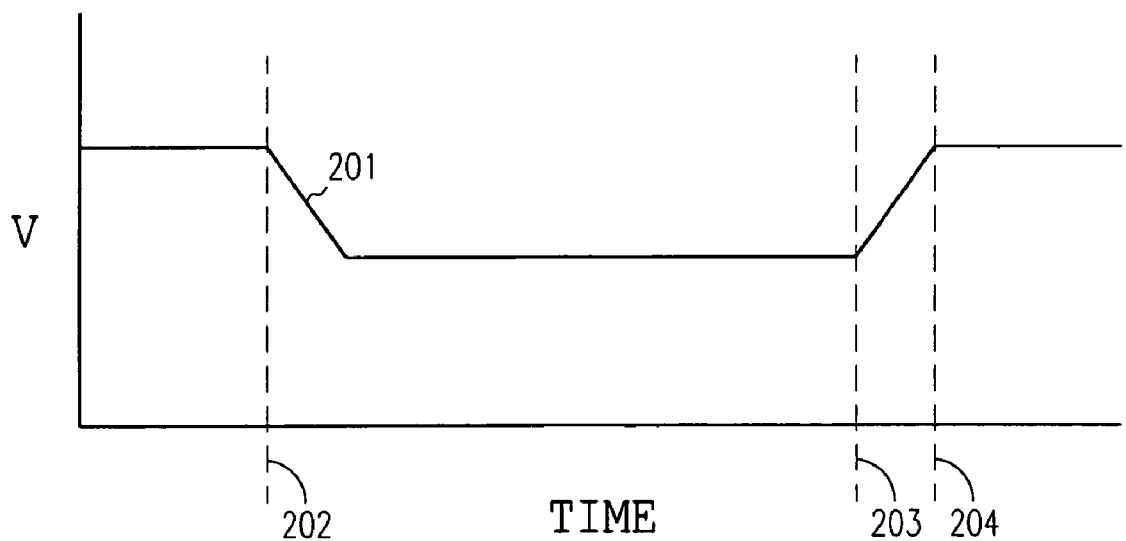
FIG. 2 is a timing diagram, illustrating power signal voltage change in an example embodiment of the invention.

In other examples, different combinations of parameter changes may cause the supplied voltage to rise even though the clock frequency is reduced. For example, in a situation where the operating frequency is reduced by half but the circuit has experienced a substantial increase in temperature, the supplied voltage can actually increase to compensate for the change in voltage required by the higher temperature circuit Although the digital logic circuits can typically operate at a lower voltage when operating with a lower clock frequency, care should be taken to provide a sufficient operating voltage to the circuit during transitions between frequency levels. FIG. 2 illustrates how this is managed in one example embodiment. The curve 201 shows how voltage varies over time in response to changes in the operating frequency of one or more digital logic circuits. At 202, the frequency of the clock signal provided to the one or more digital logic circuits is reduced from a high speed operating frequency to a lower speed operating frequency. The voltage is subsequently reduced to a lower operating voltage, selected based on the performance characteristics of the digital logic circuits and on the selected operating frequency. At 203, a frequency change is desired, and the power controller responds by raising the operating voltage from the lower operating voltage back to the higher operating voltage before the frequency change is made at 204. This diagram illustrates how the voltage in one or more digital logic circuits can be managed such that the voltage remains at a high enough level to power the digital logic circuits as frequency changes are made.

Figure 3:
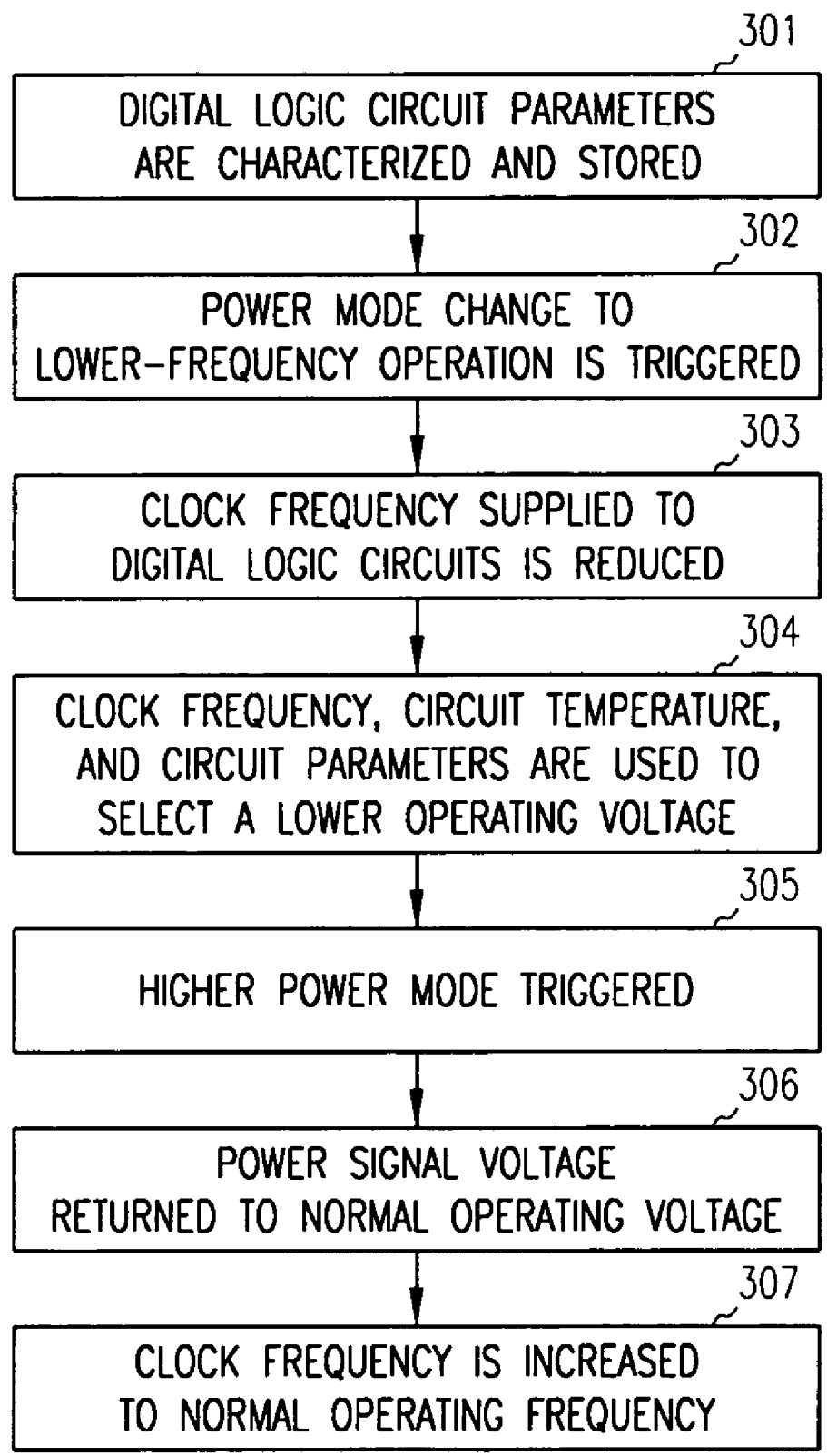
FIG. 3 is a flowchart state diagram, illustrating a way of managing power consistent with an embodiment of the invention.

FIG. 3 is a flowchart, illustrating an example method for practicing the invention. Various parameters of the digital logic circuit are measured and derived at 301, and are stored in a lookup table or used to derive a lookup table incorporating the digital logic circuit parameters. In some examples, this is done at the factory as part of the manufacturing process, such as where each particular wafer is measured and its performance is characterized before cutting the circuits into dice and packaging each integrated circuit.

At 302, a power mode change is desired or is triggered in a circuit or device containing the digital logic circuit or circuits. The power mode change in this example is a result of inactivity in a processor integrated circuit, and results in a reduction in clock frequency from a normal operating frequency of 400 MHz to 25 MHz at 303. Because the digital logic circuits in the processor are now operating at a lower clock frequency, the power controller is able to provide a reduced power signal voltage to the digital logic circuits, based on the digital logic circuit characteristics measured and stored at 301 and on the new clock frequency. In a further example, the reduced voltage is also dependent on the measured temperature of the digital logic circuits, because the various digital logic circuit characteristics measured at 301 can vary with variations in temperature.

In one example, the parameters are used in conjunction with a lookup table at 304 to select a new voltage, and the voltage is reduced after the clock frequency change has been made. The circuit then operates at a reduced clock frequency and reduced voltage until an event such as an increase in processor load, a keystroke or button actuation, or some other event causes a return to a higher power mode at 305. The high power mode is entered by first increasing the power signal's voltage at 306, and subsequently increasing the clock's operating frequency at 307.

The circuit characteristics used to select the new voltage in some embodiments are circuit parameters derived from measuring the performance of one or more circuits after manufacture. For example, the leakage current of a transistor that is switched off may vary from circuit to circuit, even in situations where the same semiconductor fabrication equipment and methods are used to build the same circuit twice. Similarly, other parameters such as switching speed and metal loss in the circuit can be measured or characterized, resulting in a profile of the circuit that characterizes the performance capabilities of a specific lot, die, or circuit. The circuit characteristics are then in various embodiments stored for application to formulas used to derive appropriate operating voltages and frequencies, or used to derive voltage and frequency data stored in a table for use in selecting appropriate voltage levels when the clock frequency is changed. In a further example, the table also includes other parameters such as circuit temperature, and in alternate embodiments the circuit characteristics are derived or measured using other processes.

Figure 4:
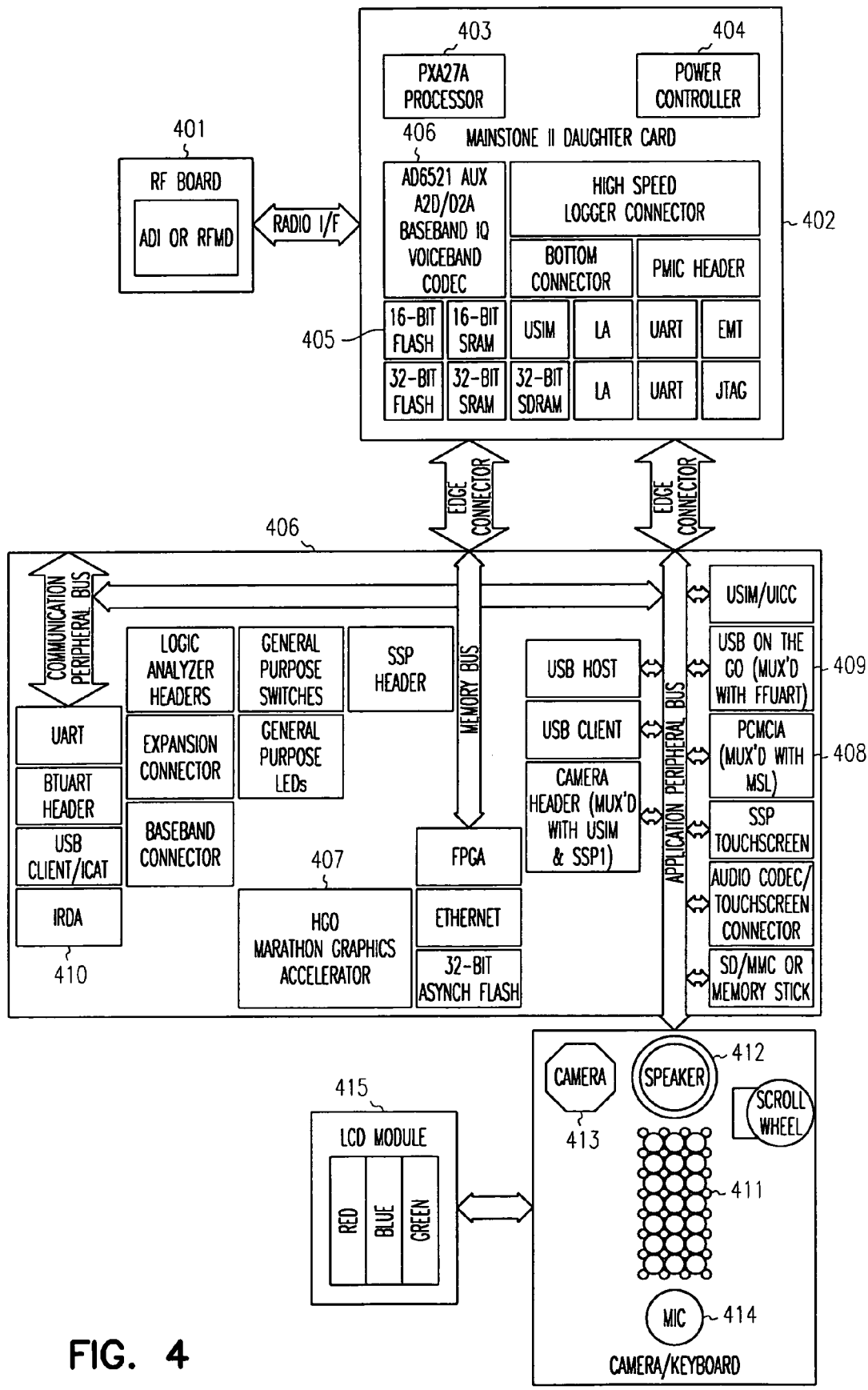
FIG. 4 is a detailed block diagram of a cellular telephone employing a power controller consistent with an example embodiment of the invention.

A more detailed example of a computerized system employing clock frequency-dependent power signal voltage control is shown in FIG. 4, which illustrates a typical portable electronic device integrating various functions such as cellular telephone, camera, and personal digital assistant (PDA) capability. The wireless communications component of the device includes an RF board 401 that is operable to receive and transmit radio frequency data, and to communicate with cellular telephone towers or base stations. The RF board is coupled to a processor board 402, which has a processor 403, a power controller 404, memory 405, and a voice data coder/decoder (CODEC) 406. The processor executes instructions loaded into system memory from the flash nonvolatile memory 405 to perform various functions such as placing or receiving calls, managing a directory, managing e-mail, and managing sounds and images such as ringtones and images taken with an onboard camera.

A system board 406 is coupled to the processor board, and provides interfaces from the processor to a variety of components such as a graphics processor 407, PCMCIA (Personal Computer Memory Card International Association format) port 408 and USB (Universal Serial Bus) port 409, and IRDA (Infrared Data Association) port 410. The system board 406's peripheral bus also couples the processor to user interface devices, such as keypad 411, speaker 412, camera 413, and microphone 414. A video display 415 is also coupled to the graphics processor 407 and to the processor 403, and is operable to display color graphics through its red, green, and blue liquid crystal display (LCD) elements.

In operation, the processor 403 executes software instructions loaded into the system memory from nonvolatile memory 405, and operates in a power state managed by power controller 404. The processor oversees receiving and sending voice data compressed via voice codec 406 and other data via the RF module 401, and controls other functions of the device, such as directory functions, e-mail, operation of the camera 413, selection of telephone ringtones, and interaction with other devices or peripherals via interfaces such as IRDA port 410, USB port 409, and PCMCIA interface 408.

If the demands placed on the processor are significantly lower than its peak capacity, such as when very few instructions are being executed to perform functions such as those described above, the processor's digital logic circuits and other circuits within the cellular phone can be brought to a lower power state by reducing the clock frequency of the digital logic circuits and reducing the voltage powering the digital logic circuits. This is performed by methods such as those previously described, and as shown in FIGS. 2 and 3.

For example, consider a state where the cellular phone is on and fully operational, but the user has not performed any action and the cell phone is not actively executing processor instructions. The power controller in this example first reduces the clock frequency of the processor to reduce the number of state transitions made by transistors within the processor to conserve power. The voltage is then reduced to a level that takes into account the process parameters of the circuits, the temperature of the circuits, and the new operating frequency of the digital logic circuits. The digital logic circuits can be brought back to a normal operating state by increasing the power supply voltage and increasing the clock frequency back to normal levels, or after a period of inactivity can make the processor inactive and reduce the voltage even further to a level where the processor isn't able to change state but is able to retain it's present state. Voltage is increased and the processor is brought out of such a low power mode when triggered by a hardware event, such as a timer, actuation of a user input such as keyboard 411 or a scroll wheel, or receipt of an incoming phone call. In further embodiments, other circuits such as the graphics processor 407 and interface controllers such as USB controller 409 are operated under the control of the power manager, and are supplied a reduced clock frequency and operated at a reduced voltage when in a reduced or low power state.

In some embodiments, the power controller's control over the circuitry in the electronic device is configurable via software, such as via an application programming interface (API) and via registers in the power controller. For example, some bits can be used as multiplier or divider bits to control the clock frequency, and can control the clock frequency of different circuit such as memory and processor independently. Similarly, a voltage level register can be used to track the voltage, and to coordinate the timing of the voltage change so that the voltage remains high enough for the digital logic circuits to remain operational as was described in conjunction with the discussion of FIG. 2. Further embodiments include registers identifying voltage levels, linking voltage changes with frequency changes, and other such variations on the examples presented here.

The power modes in the various examples discussed here are used to illustrate transition from a fully operational high power mode with a high clock frequency to a fully operational but reduced clock frequency and reduced power supply voltage low power mode and from the low power mode back to the high power mode, which in some embodiments are transitions between two of many different power modes. In a specific example, a normal mode, idle mode, deep idle mode, standby mode, sleep mode, and deep sleep mode are all supported by the power management controller. Normal mode is a state in which all internal power domains and external power supplies are fully powered and functional, and the processor clock is running at a normal speed. In idle mode, the clocks to the CPU are substantially reduced in frequency, and the power supply voltage to the CPU is reduced to a lower level dependent on factors such as the new clock frequency, the operating temperature of the circuits within the processor, and the circuit process parameters. When normal operation resumes, the clock is brought back to a substantially higher speed through a hardware control signal such as a hardware interrupt after the power supply voltage is brought back to a normal operating level. Deep idle mode is entered only after the processor's core frequency has been set to a frequency substantially lower than its normal operating frequency, and CPU clocks are disabled until resumption is triggered by a hardware event.

Standby mode further involves placing all internal power domains other than clock and oscillator signals into a low power mode where state is retained but no activity is allowed. The clock source is in some further embodiments disabled, and internal or external events such as actuation of a button trigger a wake-up to a higher power state. The low power mode in which state is retained in some embodiments includes reduction of a voltage supplied to the circuit under control to a voltage level lower than operating voltage, but higher than a zero voltage level. The voltage level is sufficient to keep the transistors of the logic circuits in their present states, but not sufficient to enable full operation of the digital logic circuits.

In sleep mode, the power domains internal to the processor other than clock and oscillator circuits used by the power manager and real time clock are powered off, and only select external domains are retained in a low voltage state in which their states are retained. Because core elements of the processor such as the pipeline, registers, and program counter are invalid after being powered down completely, resuming operation requires rebooting the cellular phone.

A further low power mode known as deep sleep mode is also employed in a further embodiment, which is essentially the same as sleep mode but in which the cell phone's states are maintained by the backup battery rather than by the main system battery or external power source. This mode is used, for example, when the phone is programmed and packaged for delivery to the end user, and may not have a main system battery attached.

These modes serve to illustrate how various logic circuit elements, whether internal or external to the processor, can be operated at a reduced clock frequency and powered with a reduced voltage power signal. It also illustrates how a reduced clock frequency and reduced power supply voltage mode can be used as a part of a sophisticated power management scheme in a portable electronic device to conserve battery power and provide greater energy efficiency.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof

The invention claimed is:

1. An apparatus comprising:
   at least one digital logic circuit; and
   a power control circuit operable to adjust the voltage of a power signal supplied to the at least one digital logic circuit in response to a change in a clock frequency provided to the at least one digital logic circuit;
   wherein the power control circuit is operable to increase the voltage of the power signal applied to the digital logic circuit before a clock frequency increase is made and is operable to decrease the voltage of the power signal applied to the digital logic circuit after a clock frequency decrease is made;
   wherein the adjusted voltage is determined based on at least one of a temperature of the at least one digital logic circuit, a semiconductor process parameter of the at least one digital logic circuit, and a highest operating frequency within the at least one digital logic circuit;
   wherein the temperature of the at least one digital logic circuit, the semiconductor process parameter of the at least one digital logic circuit, and the highest operating frequency within the at least one digital logic circuit are stored in a table.

2. The apparatus of claim 1, wherein the power control circuit is further operable to control the clock frequency provided to the at least one digital logic circuit.

3. The apparatus of claim 1, wherein the power control circuit is operable to change the voltage of the power signal applied to a plurality of digital logic circuits based on at least one of the frequency, temperature, or semiconductor process parameter of the digital logic circuit having the highest voltage demand from the plurality of digital logic circuits.

4. A method of controlling power in a computerized electronic system, comprising:
   adjusting the voltage of a power signal supplied to at least one digital logic circuit in response to a change in a clock frequency provided to the at least one digital logic circuit such that the voltage of the power signal applied to the digital logic circuit is increased before a clock frequency increase is made and the voltage of the power signal applied to the digital logic circuit is decreased after a clock frequency decrease is made, wherein the adjusted voltage is determined based on at least one of a temperature of the at least one digital logic circuit, a semiconductor process parameter of the at least one digital logic circuit, and a highest operating frequency within the at least one digital logic circuit;
   wherein the temperature of the at least one digital logic circuit, the semiconductor process parameter of the at least one digital logic circuit, and the highest operating frequency within the at least one digital logic circuit are stored in a table.

5. The method of claim 4, further comprising controlling the clock frequency provided to the at least one digital logic circuit.

6. The method of claim 4, wherein the adjusted voltage is based on at least one of the frequency, temperature, or semiconductor process parameter of the digital logic circuit having a highest operating voltage requirement from among two or more digital logic circuits.

7. A system, comprising:
   at least one digital logic circuit; and
   a power control circuit operable to adjust the voltage of a power signal supplied to the at least one digital logic circuit in response to a change in a clock frequency provided to the at least one digital logic circuit, such that the voltage of the power signal applied to the digital logic circuit is increased before a clock frequency increase is made and the voltage of the power signal applied to the digital logic circuit is decreased after a clock frequency decrease is made;
   wherein the adjusted voltage is determined based on at least one of a temperature of the at least one digital logic circuit, a semiconductor process parameter of the at least one digital logic circuit, and a highest operating frequency within the at least one digital logic circuit;
   wherein the temperature of the at least one digital logic circuit, the semiconductor process parameter of the at least one digital logic circuit, and the highest operating frequency within the at least one digital logic circuit are stored in a table.

8. The system of claim 7, wherein the power control circuit is further operable to control the clock frequency provided to the at least one digital logic circuit.

9. The system of claim 7, wherein the power control circuit is operable to change the voltage of the power signal applied to a plurality of digital logic circuits based on at least one of the frequency, temperature, or semiconductor process parameter of the digital logic circuit having a highest voltage demand from among the plurality of digital logic circuits.

10. A power controller operable to:
   adjust the voltage of a power signal supplied to at least one digital logic circuit in response to a change in a clock frequency provided to the at least one digital logic circuit such that the voltage of the power signal applied to the digital logic circuit is increased before a clock frequency increase is made and the voltage of the power signal applied to the digital logic circuit is decreased after a clock frequency decrease is made;
   wherein the adjusted voltage is determined based on at least one of a temperature of the at least one digital logic circuit, a semiconductor process parameter of the at least one digital logic circuit, and a highest operating frequency within the at least one digital logic circuit;
   wherein the temperature of the at least one digital logic circuit, the semiconductor process parameter of the at least one digital logic circuit, and the highest operating frequency within the at least one digital logic circuit are stored in a table.

11. The power controller of claim 10, further comprising controlling the clock frequency provided to the at least one digital logic circuit.

12. The power controller of claim 10, wherein the adjusted voltage is based on at least one of the frequency, temperature, or semiconductor process parameter of the digital logic circuit having a highest voltage demand from among two or more of the at least one digital logic circuits.

* * * * *